(12) United States Patent
Cadambi et al.

(10) Patent No.: US 8,131,532 B2
(45) Date of Patent: Mar. 6, 2012

(54) SOFTWARE VERIFICATION USING RANGE ANALYSIS

(75) Inventors: Srihari Cadambi, Cherry Hill, NJ (US); Aleksandr Zaks, Brooklyn, NY (US); Franjo Ivancic, Jersey City, NJ (US); Ilya Shlyakhter, Franklin Park, NJ (US); Zijiang Yang, Northville, MI (US); Malay Ganai, Plainsboro, NJ (US); Aarti Gupta, Princeton, NJ (US); Pranav Ashar, Belle Mead, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 579 days.

(21) Appl. No.: 11/422,068

(22) Filed: Jun. 3, 2006

(65) Prior Publication Data

US 2006/0282806 A1     Dec. 14, 2006

Related U.S. Application Data

(60) Provisional application No. 60/687,491, filed on Jun. 3, 2005.

(51) Int. Cl.
*G06F 9/45*     (2006.01)
*G06F 9/44*     (2006.01)
*G06F 9/455*     (2006.01)

(52) U.S. Cl. .............................. 703/22; 717/126; 703/26

(58) Field of Classification Search .................. 703/26, 703/22; 717/126
See application file for complete search history.

(56) References Cited

U.S. PATENT DOCUMENTS

| | | | | |
|---|---|---|---|---|
| 6,192,505 B1 * | 2/2001 | Beer et al. | | 716/2 |
| 6,848,088 B1 * | 1/2005 | Levitt et al. | | 716/4 |
| 2005/0204345 A1 * | 9/2005 | Rivera et al. | | 717/127 |

OTHER PUBLICATIONS

A. Armando, C. Castellini, J. Mantovani, "Introducing Full Linear Arithmetic to Symbolic Software Model Checking.", Technical Report, DIST, University of Genova. May 2004, 19 pages.*

* cited by examiner

*Primary Examiner* — David Silver
(74) *Attorney, Agent, or Firm* — Jeffrey Brosemer; Joseph Kolodka

(57) ABSTRACT

A system and method is disclosed for formal verification of software programs that advantageously bounds the ranges of values that a variable in the software can take during runtime.

8 Claims, 5 Drawing Sheets

```
void foo(int N){
    int i = 0;
    while (i ≤ N){
        i++;
    }
}
```

FIG. 4

SOFTWARE VERIFICATION USING RANGE ANALYSIS

CROSS-REFERENCE TO RELATED APPLICATIONS

This application claims the benefit of U.S. Provisional Patent Application Ser. No. 60/687,491 filed Jun. 3, 2005. This application is related to U.S. Pat. No. 7,346,486, the contents of which are incorporated herein by reference as if set forth at length herein.

BACKGROUND OF INVENTION

This invention is related to techniques for formal analysis and verification of software. More particularly, it pertains to improved techniques employing range analysis.

Model checking is a technique for the automatic verification of concurrent systems. It exhibits several advantages over simulation, testing, and deductive reasoning, and has been used successfully to verify complex sequential circuit designs and communication protocols. (See E. M. Clarke, O. Grumberg, and D. A. Peled, "Model Checking," MIT Press, 2000.) Of particular advantage, model checking is an automatic technique, and if the design being tested contains an error, the model checking technique produces a counter-example (i.e., a witness of the offending behavior of the system) that can be used to debug the system.

An alternative technique for the verification of software systems—symbolic model checking using binary decision diagrams (BDDs)—potentially provides exhaustive coverage of large state-spaces. Unfortunately symbolic model checking using BDDs does not scale well in practice.

Yet another alternative technique for the verification of software systems is bounded model checking (BMC) focusing on the search for counter-examples of bounded length only. See, for example, A. Biere, A. Cimatti, E. M. Clarke, M. Fujita, and Y. Zhu, "Symbolic model checking using SAT procedures instead of BDDs," Proc. of the 36th ACM/IEEE Design Automation Conference, pp. 317-20 (1999). This technique effectively translates a problem to a Boolean formula, such that the formula is satisfiable if and only if there exists a counter-example of length k. In practice, k can be increased incrementally starting from one to find a shortest counter-example—if one exists. However, additional reasoning is needed to ensure completeness of the verification when no counter-example exists.

The satisfiability check in the BMC technique is typically performed by what is generally known as a "back-end" SAT-solver. See, e.g., M. K. Ganai, L. Zhang, P. Ashar, and A. Gupta, "Combining strength of circuit-based and CNF-based algorithms for a high performance SAT solver," in Design Automation Conference, 2002; E. Goldberg and Y. Novikov, "Berkmin: A fast and robust SAT solver," in Design Automation and Test in Europe, pages 132-39, 2002; J. P. Marques-Silva and K. A. Sakallah, "GRASP: A search algorithm for prepositional satisfiability," IEEE Transactions on Computers, 48:506-2 1, 1999; and M. Moskewicz, C. Madigan, Y. Zhao, L. Zhang, and S. Malik, "Chaff: Engineering an efficient SAT solver in Design Automation Conference, 2001.

Recently, it has been proposed to apply bounded model checking techniques to the formal verification of software using predicate abstraction in a counterexample-guided refinement flow. See, for example, commonly assigned U.S. Pat. No. 7,346,486 the contents of which are incorporated by reference herein. Despite improvements, it would be advantageous to reduce the complexity of the bounded model checking by reducing the size of the program's state vector.

SUMMARY OF INVENTION

A verification system and method for software is disclosed which advantageously bounds the actual range of values that a variable in the software can take during runtime. An embodiment according to the invention is disclosed which derives ranges valid for all executions by reducing range determination to a system of linear inequalities between symbolic bound polynomials, which can be solved by reduction to a linear programming problem.

An alternative embodiment according to the invention is disclosed which derives tighter ranges which are only valid for executions of up to k steps. Such ranges can be used to improve bounded model checking analysis. This alternative embodiment iteratively propagates solutions to the linear inequalities of the first embodiment across basic blocks of the program for k cycles.

The disclosed range analysis techniques serve to improve the performance of bounded model checking, with or without predicate abstraction. When used without abstraction, the disclosed range analysis techniques reduce the complexity of bounded model checking by reducing the sizes of the program's state vector. When used with abstraction, the disclosed range analysis techniques serve to reduce the complexity of SAT-based enumeration used in counterexample guided abstraction refinement flow to generate constraints that remove false counterexamples.

The disclosed range analysis techniques not only facilitate faster analysis of software models through faster and higher quality software verification, it also potentially increases the range of applications for which software verification is applicable. These and other advantages of the invention will be apparent to those of ordinary skill in the art by reference to the following detailed description and the accompanying drawings.

BRIEF DESCRIPTION OF DRAWING

FIG. 4 is another example C program; and

DETAILED DESCRIPTION

Figure 1:
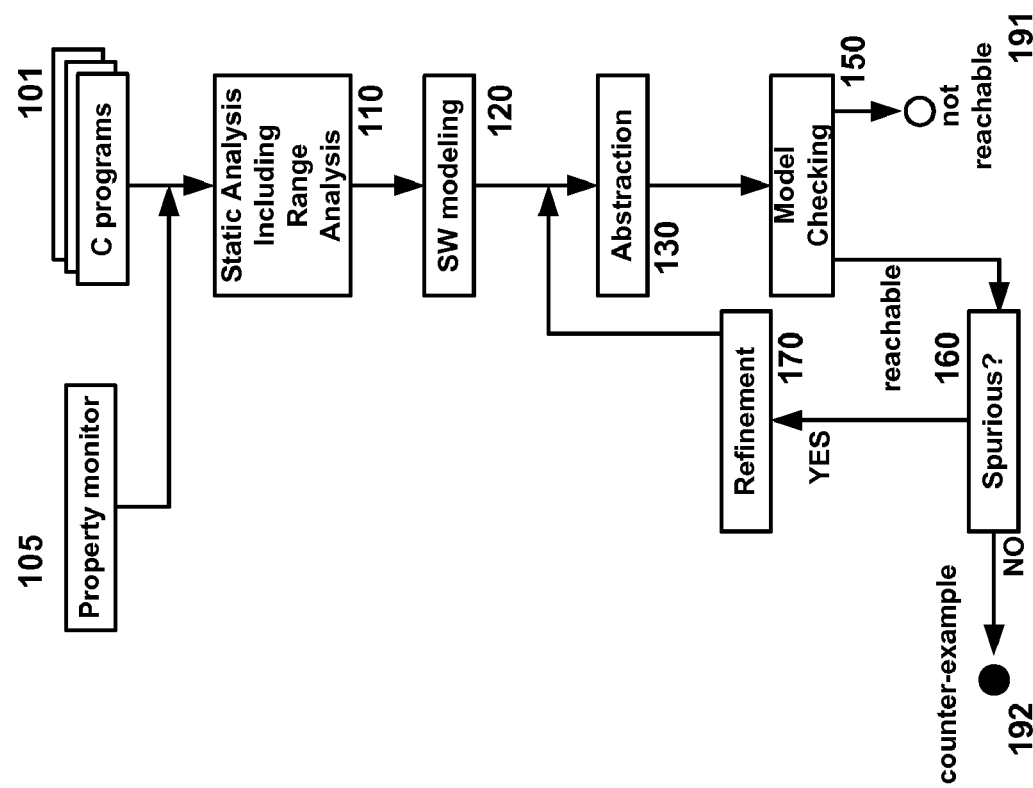
FIG. 1 shows an abstract diagram illustrating processing performed by a software verification system, suitable for practice of an embodiment of the present invention.
Figure 2:
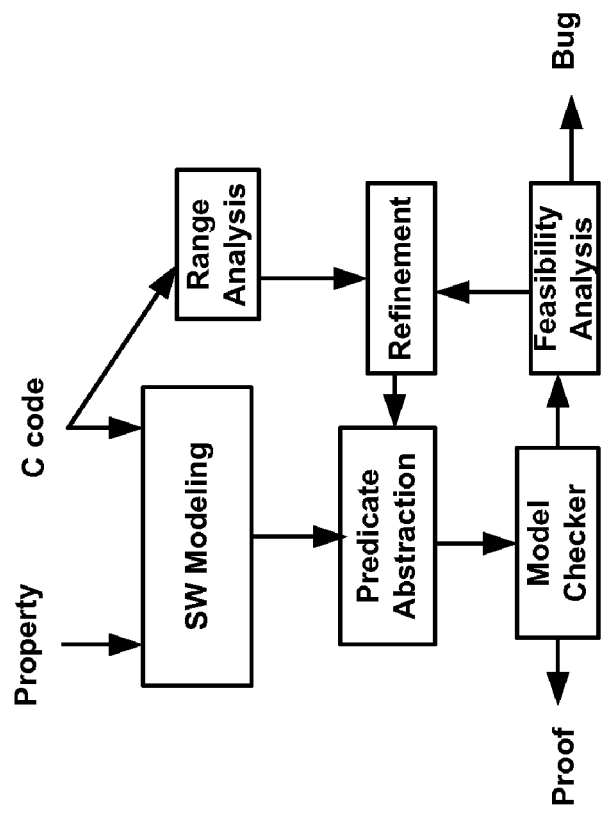
FIG. 2 shows an abstract diagram illustrating how the disclosed range analysis techniques can be incorporated with the software verification processing.
Figure 2:
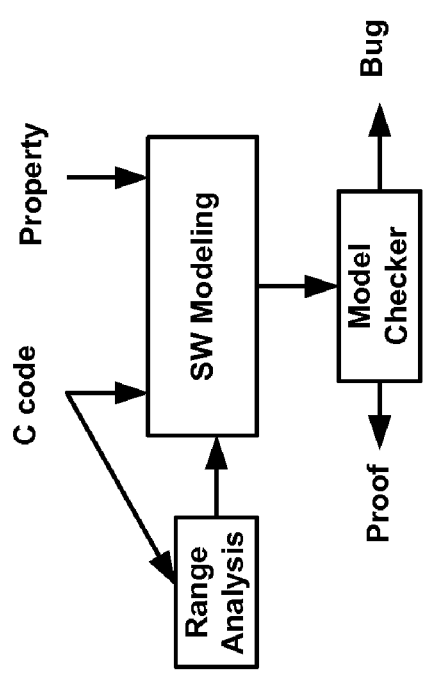

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative of structures embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, read-only memory (ROM) for storing software, random access memory (RAM), and non-volatile storage. Other hardware, conventional and/or custom, may also be included and may be shown in the FIGS. as conceptual only. Their function may be carried out through the operation of program logic, through dedicated logic, through the interaction of program control and dedicated logic, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Finally, unless otherwise explicitly specified herein, the drawings are not drawn to scale.

FIG. 1 is an abstract block diagram illustrating the operation of a verification system, suitable for practice of an embodiment of the present invention. The input to the system is a software program 101 and a representation 105 of the property to be checked. The output of the system is a result that either proves that the software program 101 satisfies the property at 191 or provides a counter-example that disproves the property at 192 (or the analysis can terminate without a conclusive result due to resource constraints such as a time-out or memory exhaustion).

The detailed operation of the verification system illustrated in FIG. 1 is described in U.S. Non-Provisional Utility patent application Ser. No. 11/040,409, entitled "SYSTEM AND METHOD FOR MODELING, ABSTRACTION, AND ANALYSIS OF SOFT WARE," filed on Jan. 21, 2005, the contents of which are incorporated herein by reference.

As depicted in FIG. 1, certain preprocessing steps are used to simplify the source code. For example, code simplification removes function calls inside other function calls by adding temporary variables. A control flow graph (CFG) of the source code is then extracted at 111.

A main feature of the CFG-building process is that all functions are inlined at most once. (Bounded recursion is supported by including a fixed-length stack.) For each function, a collection of basic blocks is built, and variables are allocated for the function's formal arguments and a special variable storing the ID of the call site to return to. When function $f$ calls function g, the system generates assignment statements to assign actual arguments to formal arguments, and the ID of the call site to the return variable. The function call is then expressed as a jump to the first basic block of g.

At the end of the function g, a switch statement is generated that causes a jump back to the call site in $f$ from which g was called. A key point is that function calls and parameter-passing can be desugared into a flat CFG. Thus only intraprocedural analysis is required. It is possible to support primitive data types, pointers, static arrays and records. As to dynamically created data structures such as dynamic arrays and linked-lists, an upper bound on the length is required and should be provided by the user. Furthermore, all control flow logic constructs of C can be completely supported. A program counter (PC) variable can be then introduced to monitor progress in the control flow graph for verification purposes.

Figure 3:
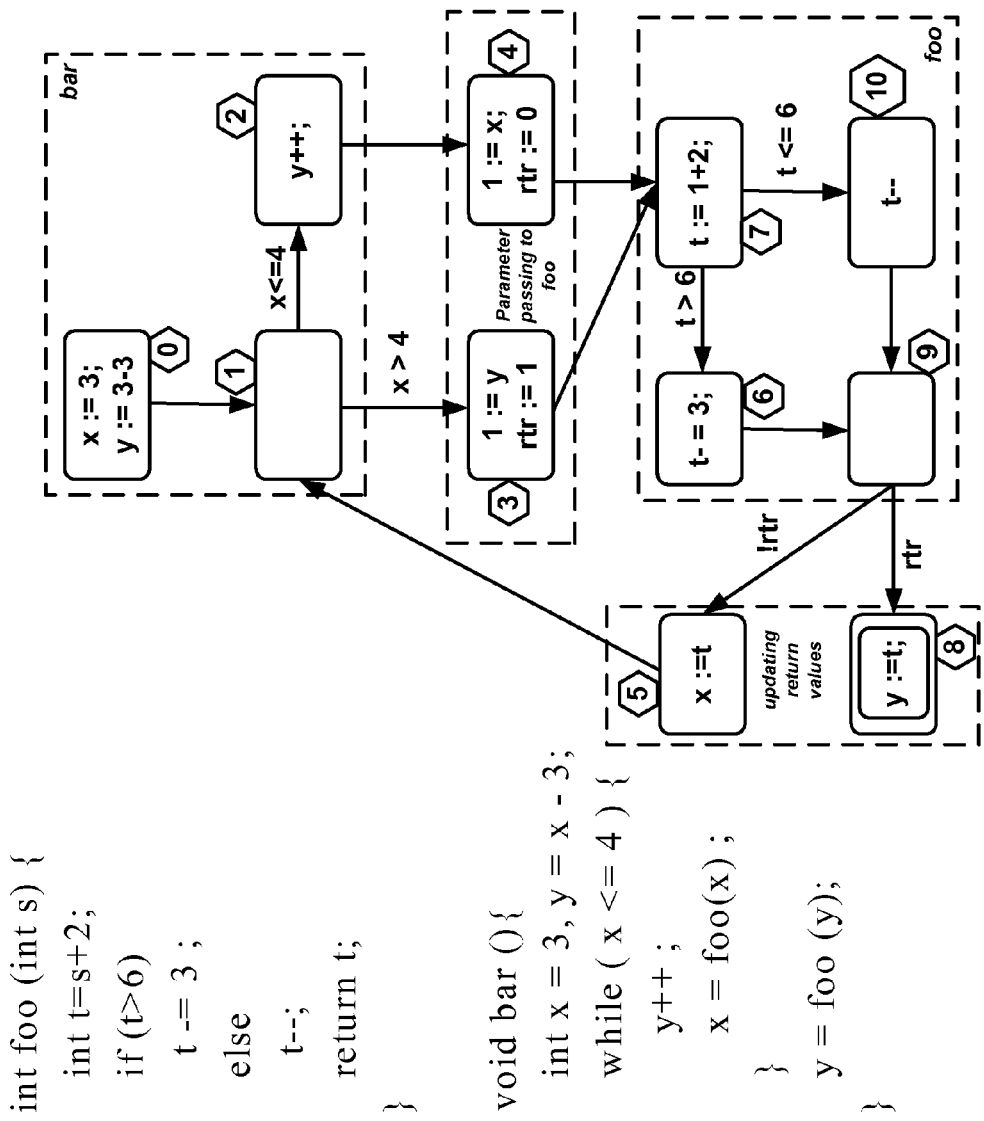
FIG. 3 is example C code that shows the control flow information generated for the code.

FIG. 3 shows an example of the software modeling approach. The computed CFG is depicted next to the original C code. Each basic block is identified by a unique number shown inside the hexagon adjacent to the basic block. The source node of the CFG is basic block 0, while the sink node is the highlighted basic block 8. The example in FIG. 3 pictorially shows how non-recursive function calls are included in the control flow of the calling function.

A preprocessing analysis determines that function foo is not called in any recursive manner. The two return points are recorded by an encoding that passes a unique return location as a special parameter using the variable rtr. Additional variables are introduced when pointer variables are declared.

The declaration int **p creates three variables $v_p, v'_p, v''_p$, where $v_p$ stands for p, $v'_p$ for *p, and $v''_p$ for **p. The variables representing pointers, that is $v_p$ and $v''_p$ are desugared into variables of type unsigned int. Similarly, int *a, *b creates four variables $V_a, V'_a, V_b, v'_b$, while a dereference in the C code, such as &a, also leads to additional variables—in this case the variable $'v_a$.

Additional assignments have to be inferred due to aliasing and newly introduced variables. First, an assignment p=&a becomes $v_p = 'v_a$. Since p=&a implies *p=a and **p=*a, two new assignment $v'_p = v_a$ and $v'_p = v_a$ are also inferred. An assignment a=&x gives rise not only to the assignment $v'_a = v_x$ but also to conditional assignments due to aliasing. Since p may equal &a, it is possible that *p and **p are assigned new values when a is assigned. This results in the conditional assignments *p=(p==&a)?&x:*p and p=(p==&a)?x:p.

Advantageously, some of the conditions in the conditional assignments can be removed based on previous assignments in the same basic block. In order to convert the sequential assignments to parallel assignments, we also remove all possible read-after-write hazards through substitution. In addition, some assignments are redundant when considering a basic block as one atomic step. In particular, the assignments at later steps may overwrite previous assignments.

As will be readily appreciated by those skilled in the art, some of the features which emerge from the above modeling that affect the range analysis techniques presented herein are:

All functions are inclined at most once by use of separate edges for each call. This allows the verification system to focus only on intra-procedural analysis instead of the more corn placated inter-procedural analysis. This also allows the system to handle bounds on return values of functions.

Memory allocations are modeled using a finite heap. In general, the preprocessing of pointers creates additional variables which are de-sugared to be of type unsigned int. Fortunately, the latter can be successfully bounded using the range analysis techniques discussed herein.

The result is a single control flow graph that includes all function calls, which serves as the actual input to the verification processing.

Constraint System Generation

The first step of the range analysis technique which is the subject of the instant invention is the generation of a symbolic constraint system. In this section we describe the generation of this constraint system, which can then be analyzed by a linear program solver as described later.

In generating the symbolic constraint system, there are two basic rules which must be followed:

For each assignment, update the bounds at the corresponding basic block of the variable on the left hand side with the bounds of the expression found on the right hand side; and If a transition can be taken from a block $B_i$ to some block $B_j$ a range of a variable v at the beginning of block $B_j$ must include all possible values the variable v can have just before such a transition. In particular, the rule enforces that if a transition from $B_i$ to $B_j$ can always be taken (no guard), then the range of a variable v at the beginning of block $B_j$ must include the range of v at the end of block $B_i$.

For each basic block $B_i$ in the control-flow graph of a procedure $f$ we define two program locations: $pre_i$ to represent the start of the basic block $B_i$ and $post_i$ to represent the end of the block. The set of local integer variables (including pointer variables) after preprocessing procedure $f$ is denoted by $V_f$. A variable v such that $v \in V_f$ is called a range variable. $P_f \subseteq V_f$ is a set of formal parameters of procedure $f$ that are defined to be integers.

We use $v_{loc}$ to denote the value of the variable v at the program location loc. For each formal parameter p, we use $p_0$ to symbolically represent the value of the actual parameter that corresponds to p. We focus the rest of our discussion on the case where the values of the actual parameters are positive. It should be noted that the set $P_f$ of formal parameters is often empty and generally small, since we consider one control flow graph with a single entry basic block. Additionally, since we consider one entry function $f$ we only need to consider one set $V_f$ and one set $P_f$.

For each variable $v \in V_f$ and a program location loc let $L_{loc}^v$ and $U_{loc}^v$ represent the lower and upper bounds, respectively, of the value of v at the program location loc. We initially set $L_{loc}^v$ and $U_{loc}^v$ to be a linear combination of the parameters of $f$ with unknown rational coefficients. Formally, we define $$L_{loc}^v = C + \sum_{p \in P_f} C_p \cdot p_0.$$

We can similarly define $U_{loc}^v$.

We define l(e,loc) to represent the lower bound of an expression e at location loc. We compute l(e, loc) for a constant c, a variable v and expressions e, $e_1$ and $e_2$ as follows:

$$l(c, loc) = c$$
$$l(v, loc) = L_{loc}^v$$
$$l(e_1 + e_2, loc) = l(e_1, loc) + l(e_2, loc)$$
$$l(c \cdot e, loc) = \begin{cases} c \cdot l(e, loc) & c \geq 0 \\ c \cdot u(e, loc) & c < 0 \end{cases}$$

Whenever we cannot compute a bound we let l(e,loc)=−∞, where "−∞" correspond to the most conservative lower bound (the minimum value) of the particular integer data type used. As an example, for unsigned int we would use 0 as the most conservative lower bound. Similarly, we can define u(e, loc) for upper symbolic bounds of expressions.

We generate initialization constraints for the location $pre_0$ that represents the beginning of the initial basic block $B_0$. For each $p \in P_f$ we require that $L_{pre_0}^p = U_{pre_0}^p = P_0$. For each $v \in V_f \setminus P_f$ we require that $L_{pre_0}^v = -\infty$ and $U_{pre_0}^v = +\infty$, if the user does not specify additional environmental constraints (on global variables, for example). Recall that we use the symbols "−∞" and "∞" to represent various constants depending on the actual type of the variable. For an assignment within block $B_i$ of the form v=e, where $v \in V_f$, we generate the following assignment constraint: $L_{post_i}^v = l(e, pre_i) \wedge U_{post_i}^v = u(e, pre_i)$. Assignment constraints define the bounds after execution of the expressions in a basic block. In case a variable v is not reassigned in block $B_i$ we generate the following propagation constraint:

Whenever we can make a transition from a basic block $B_i$ to a basic block $B_j$ we require that for every $v \in V_f$, the range of v at the beginning of $B_j$ includes the range of v at the end of $B_i$. Formally we add the following flow constraint to the constraint system: $L_{pre_j}^v \leq L_{post_i}^v \wedge U_{pre_j}^v \geq U_{post_i}^v$. After the constraint system is generated, we perform several fast constraint system simplifications before we invoke the LP solver. These are used to reduce the number of variables and constraints in the system.

The constraint system as defined above, comprising initialization, assignment, propagation and flow constraints, is comprehensive enough to ensure the soundness of the bounds that are solutions of the constraint system. However, additional information implied by conditionals (guards) in the program or control flow graph may help to further minimize the resulting ranges. For example, consider the case that the range of a variable v before a conditional is $v \in [0,100]$, but the condition guarding the transition to a new block is $v \geq 20$. If there is no other incoming edge to the new block, then the actual lower bound for v in the new block can be safely assumed to be 20 and not 0.

In general, consider a transition from a basic lock $B_i$ to a basic block $B_j$ and a guard of the form $v \geq e$, where $v \in V_f$. Assume that the following constraint is satisfied: $L_{pre_i}^v \leq l(e, post_i)$. Then, whenever we can make a transition from $B_i$ to $B_j$ we are guaranteed that the lower bound of v at the beginning of $B_j$ is less or equal to the value of v at the end of $B_i$ at the time of the transition. So, we can relax the corresponding flow constraint to:

$$L_{pre_j}^v \leq L_{post_i}^v \vee L_{pre_j}^v \leq l(e, post_i).$$

Often we can omit the flow constraint altogether. However, since we do not know a priori the relationship between $L_{post_i}^v$ and $l(e, post_i)$ we introduce a disjunction that ultimately results in higher precision. Other comparison operators $\{\leq,<,>\}$ can be handled in a similar fashion. Note that we may first need to solve the conditional in terms of a specific variable before generating the constraint.

However, the addition of disjunctions into an otherwise purely conjunctive constraint system presents a challenge to the general approach advocated here. As mentioned earlier, we use powerful LP solvers to perform an efficient analysis of the linear constraint system. Adding disjunctions into the constraint system prevents us from using pure LP solvers where all variables are rational (since disjunctions are not linear).

As a short example, consider the following code for variables x and y of type unsigned int, with basic blocks $B_1$ and $B_2$:

$B_1$:while ($x \leq y+1$)

$B_2$:y--;

The condition $x-1 \leq y$ can be solved in terms of both x and y, generating two constraints: $L_{pre_2}^y = l(x-1, post_1)$ and $U_{pre_2}^x = u(y+1, post_1)$ In general, at most one of the constraints generated from a conditional is useful; the other will often be ignored by satisfying the corresponding flow constraint. In our example, if we use the conditional and bound y from below by x−1, we may get a useful bound on y. On the other hand, bounding x from above by y+1 may be useless if y was unbounded before. By allowing disjunctions in our constraint system to handle conditionals, we let the constraint solver pick the choice which results in a tighter bound when possible.

In contrast to our approach, the algorithm described in R. Rugina and M. Rinard, "Symbolic Bounds Analysis of Pointers, Array Indices, and Accessed Memory Regions," in SIGPLAN Conference on Programming Language Design and Implementation, pp. 182-95 (2000), would simply generate only one constraint per conditional, bounding the variable on the left hand side by the right hand side. For the above example, only the constraint $U_{pre_2}^u = u(y+1,post_1)$ is added to the system of constraints, regardless of the body of the while-loop. Also, since the approach in the Rugina et al. paper does not allow disjunctions, this constraint is used instead of the corresponding flow constraint. Clearly, the constraint system does not gain any precision from handling the conditional in this manner.

Moreover, if we change the body of the loop to read y=sqrt (y), where sqrt represents the (non-linear) square root function defined for unsigned int, using the conditional would adversely affect the upper bound of x. Since, in this scenario, y is updated using a non-linear function, it is unbounded. In particular, its upper bound becomes ∞.

In the approach used in the Rugina paper, which requires the upper bound of x to be greater than or equal to the upper bound of y+1, this would force the upper bound of x to be unbounded as well. In contrast, in our approach, we would still be able to satisfy the flow constraint instead of the conditional, thus finding that the upper bound of x does not change during processing of the while-loop.

Figure 4:
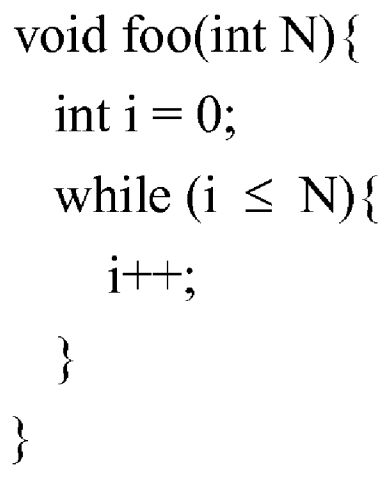
Figure 5:
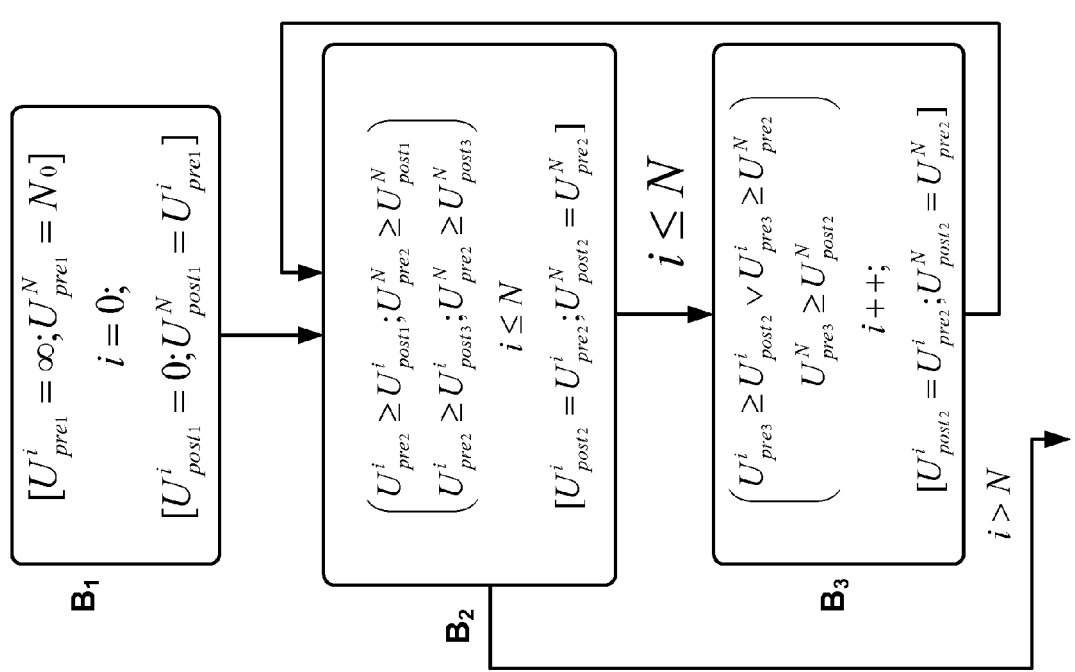
FIG. 5 is a corresponding symbolic constraint system generated from the C program of FIG. 4.

As an example, consider the program presented in FIG. 4. The corresponding control flow graph and the generated symbolic constraint system are shown in FIG. 5. We note that the generated constraints for the lower bounds have been omitted from the figure in order not to clutter the figure.

As mentioned prior, the generated constraints guarantee the soundness of the resulting ranges. However, we are interested in the optimal, most precise range information. Therefore, we add the following objective function to the LP problem, which minimizes the total number of values to be considered:

$$\sum_{v \in V_f} \sum_{B_i \in R_v} |U_{pre_i}^v - L_{pre_i}^v|,$$

where $R_v = \{B_i \in B | v$ is read in block $B_i\}$

Intuitively, it is clear that some bounds are independent of some other bounds. To formalize this notion we introduce a dependency graph of bounds. The nodes in the graph represent bounds. For a block $B_i$ and a variable v there are exactly 4 nodes in the graph corresponding to $L_{pre_i}^v, U_{pre_i}^v, L_{post_i}^v$, and $U_{post_i}^v$. For every generated constraint in the constraint system, there is an edge from the node that represents the bound on the left hand side to any node that represents a bound on the right hand side. We then decompose the graph to strongly connected components and process each component separately in reverse topological order. The Unboundedness of any range variable usually forces the whole system to be declared infeasible. Decomposition prevents the propagation of such effects between unrelated variables. This allows us to find good bounds for many variables even though there are some other variables that cannot be bounded by this approach.

Constraint System Analysis

Even without any modifications to the generated constraint system, it resembles an LP problem. There are, however, several important distinctions. First, lower and upper bounds are linear expressions with unknown rational coefficients, not just unknown variables. Of course in the case when $f$ does not have any parameters the symbolic expressions are reduced to rational variables and can be directly used as LP problem variables. The second important difference is that, in general, LP solvers do not support arbitrary Boolean connectives, but rather there is an implicit conjunction of all constraints. For our technique to work, we need to handle disjunctions as well.

Consider a symbolic constraint of the form $$L_{loc'}^v \leq L_{loc}^v, \text{ where } L_{loc}^v = C + \sum_{p \in P_f} C_p \cdot p_0 \text{ and } L_{loc'}^v = C' + \sum_{p \in P_f} C'_p \cdot p_0.$$

For such a case, we generate the following linear inequality constraint that can be directly submitted to the LP solver:

$$C' \leq C \wedge \left(\bigwedge_{p \in P_f} C'_p \leq C_p\right)$$

Assuming positivity of parameters, the new constraint is actually stronger than the original one. Hence, the transformation preserves the soundness of the bounds. Other constraints can be handled the same way. For cases where we cannot assume positivity of the parameters, we may need to perform an inefficient case split of the analysis for the possible combinations of positive and negative parameters.

Similarly, we convert a symbolic objective function of the constraint system into a linear objective function. Assuming that $$L^v_{pre_i} = X^v_{pre_i} + \sum_{p \in P_f} X^v_{pre_i,p} \cdot p_0 \text{ and } U^v_{pre_i} = Y^v_{pre_i} + \sum_{p \in P_f} y^v_{pre_i,p} \cdot p_0,$$

we then rewrite the objective function $$\sum_{v \in V_f} \sum_{B_i \in R_v} |U^v_{pre_i} - L^v_{pre_i}| \text{ as}$$

$$\sum_{v \in V_f} \sum_{B_i \in R_v} \left| Y^v_{pre_i} - X^v_{pre_i} + \sum_{p \in P_f} (Y^v_{pre_{i,p}} - X^v_{pre_{i,p}}) \right|$$

As described earlier, the addition of disjunctions into an otherwise purely conjunctive constraint system presents a challenge to the approach using LP solvers. If one chooses to consider disjunction however, our technique may also implement an approach based on encoding disjunctions via integer variables. The technique may also employ several heuristics beforehand to reduce the number of disjunctions.

We describe our approach using a small example. Consider the following constraint:

$$L^v_{pre_j} \leq L^v_{post_i} \vee L^v_{pre_j} \leq l(e, \text{post}_i).$$

We introduce two new binary variables $D_1$ and $D_2$ and M denotes some large positive number. Our original constraint is then replaced with the following constraint:

$$(D_1+D_2 \leq 1) \wedge (L^v_{pre_j} - M \cdot D_1 \leq L^v_{post_i}) \wedge (L^v_{pre_j} - M \cdot D_2 \leq l(e, \text{post}_i)).$$

The new constraint is stronger than the original one, and the two constraints are actually equivalent if M is sufficiently large. Note that the newly introduced variables $D_1$ and $D_2$ are the only variables that need to be pure integer variables, while all others can have rational values. For problems with small numbers of integer variables, performance of MLP solvers isn't noticeably worse than performance of LP solvers.

In the following we briefly describe some of the heuristics we employ to resolve some disjunctions before we invoke the appropriate LP solver for the resulting constraint system.

Drop a constraint if some bound on the right hand side is close to M. For several practical reasons, mostly due to lack of necessary precision of floating-point numbers, we may not be able to set M as high as we wish. If we were not to drop such disjunctive constraints, we may actually treat the disjunctive constraint as a conjunctive constraint instead. Therefore, we resolve this problem by dropping a constraint from the disjunction.

Drop a constraint f some bound on the right hand side has not yet been determined. As in the previous case the unknown bound value might be close to M and we would have the same issue that was described in the previous heuristic. Furthermore, if the unknown value cannot be bounded, the whole constraint system would be declared infeasible and thus unbounded. Theoretically, this problem can be avoided by relaxing every constraint with the possibility of setting the lhs with the most conservative value.

Prefer to satisfy the flow constraint. It is clear, that we cannot drop both sides of a disjunction. That is, if the aforementioned rules require that both constraints of a disjunction be removed, we need to keep at least one of the two in the resulting constraint system. In such a case, we prefer to leave the flow constraint in the constraint system, since it refers to one program variable only.

Bounded Range Analysis

In accordance with an embodiment of an aspect of the invention, we propose the idea of bounded range analysis, which computes ranges by exploiting the fact that the range information, if used only in a bounded model checking run of depth k, does not have to be sound for all computations of the program, but only for traces up to length k. By concentrating on a bounded length trace only, we are able to find tight bounds on many program variables that cannot be bounded using the technique described earlier. As an example, consider the following code:

int $i=0, j=$readInput( ); while($i<j*j$){$i++$;}

If one were to consider all possible traces, then the upper bound for i would have to be declared unbounded: j is not bounded, and the expression j*j is not linear. However, if we are only concerned with the traces up to k steps, it is safe to conclude that the value of i will always be in the range from 0 to k.

A straightforward way to compute such ranges is to perform a BFS on the control flow graph with depth limit set to k which updates the lower and upper bounds for the individual basic blocks. Although this approach results in very precise ranges, it may not be very efficient for large k. We propose the following algorithm that can be easily implemented on top of the constraint based approach described earlier. For a fixed number of steps (depth), its runtime is quadratic in terms of the code size.

Initialize all bounds to the least conservative values;
for(i=0; i<# steps; i++)
  for each basic block $B_j$
    for each variable v,v∈$V_f$
      update $L^v_{pre_j}, U^v_{pre_j}, L^v_{post_j}$, and $U^v_{post_j}$
      using constraints This simple method can be further improved in several ways, in particular to support non-linear functions.

Support for non-linear functions. In case a function does not have any parameters, we can easily extend the algorithm to support many important non-linear functions. The restriction on the presence of parameters is not severe. Expressing bounds as a linear combination of parameters is mostly useful for inter-procedural analysis. Since mimes all function calls, parameters of called functions can be ignored. Consider an assignment y=x² in a block $B_i$. The following rules can be used to update $L^y_{post_i}$ and $U^y_{post_i}$: $L^y_{post_i}=0$ and $U^y_{post_i} = \max(|L^x_{pre_i}|, |U^x_{pre_i}|)^2$.

Increasing precision. This method and the BFS-like approach represent two extremes. By moving towards the middle, we can increase precision, while sacrificing the running time. Of course, it is worthwhile doing so, as long as decrease in efficiency is reasonable compared to the savings we gain during later stages of verification.

Range Analysis for Modeling of Arrays

In this section, a description is provided of how program arrays can be modeled and how range analysis can improve the efficiency of model-checking when arrays are present.

A simple way to model arrays is to create, for each n-element array, n simple variables representing array elements. The entire contents of the array is thus modeled explicitly as part of the state vector. A read from an array element A[e], where e is the indexing expression, is converted to a multiplexor of the form e==0?$A_0$:(e==1?$A_1$: ... ) where $A_i$ are the simple variables representing specific array elements. A write to an array element A [e]=v is converted to a block of assignments, one to each array element, of the form $A_i$=(e==i)?v: $A_i$.

In co-pending commonly-assigned U.S. Non-Provisional patent application Ser. No. 11/037,920, entitled "Efficient Modeling of Embedded Memories in Bounded Memory Checking," filed on Jan. 18, 2005, an efficient technique is therein described for bounded model checking of systems with embedded memories. Instead of explicitly modeling each bit of an embedded memory as a latch, the embedded memory is removed from the design but the interface signals between the embedded memory and the rest of the system are preserved.

The interface comprises of one or more read and write ports; on each port there are address signals, data signals and enable signals. The read/write address signals, read/write enable signals, and write data signals are primary outputs of the circuit defining the FSM's transition relation; the read data signals are primary inputs. When the read enable signal is asserted, the primary inputs are set to the data stored in the memory address specified by the read address signals; when the write enable signal is asserted, the write data specified by the write data signals is written into the memory at the address specified by the write address signals.

The semantics of embedded memory guarantees that the value read from a given address is the last value written to that address. This semantics can be expressed in BMC by adding constraints on the Boolean variables representing the memory interface signals at various steps of the trace. The constraints require that the data signals at steps i and j (i<j) be equal if the write enable at i and the read enable at j are asserted, the write address signals at i and the read address signals at j are equal, and for all times steps between i and j either the write enable isn't asserted or the write address signals differ from the read address signals at j. The size of these EMM constraints depends quadratically on the number of memory accesses and the number of read and write ports; and linearly on the address and data widths and the number of memories.

In the present verification system, embedded memories can be used to model program arrays. Each array is modeled as a separate embedded memory. When translating the CFG to a Boolean model, array reads are translated to reads from the embedded memory (i.e. to vectors of primary inputs representing the read data of the memory). Array writes are translated to embedded memory writes: Boolean translation of array indexing expressions is used for write address signals, and Boolean translation of the right-hand side of an assignment to an array element is used for write data signals. Read and write enable signals are derived from latches representing the program counter; read (write) enable signal is constructed to be true if the program counter points to a basic block in which an array read (write) occurs. Modeling arrays as embedded memories adds EMM constraints during BMC analysis, but removes from the state vector the explicit array variables, and removes from the transition relation logic the multiplexors used in the explicit array representation.

Range analysis can give a bound on the width of array data, as well as on the width of the indexing expressions used to index the array. This information can lead to more efficient array modeling with either of the two array representations we have described. For explicit arrays, bounding the width of array data lets us use fewer latches for each of the explicit variables allocated to array elements; bounding the address width reduces the amount of logic needed to represent the multiplexors to which array accesses are translated. For arrays modeled as embedded memories, bounding the address or data width lets us use fewer address or data signals; this both simplifies the transition relation and reduces the size of EMM constraints added during BMC.

Range analysis methods described in earlier sections can give bounds on values of variables used to index the arrays; even for arrays indexed by complex expressions, the bounds on variables at the leaves of an expression can help bound the width of the expression result. However, these methods often fail to give useful bounds on array data width. This happens because a condition on an array access need not apply to any particular array element. For example, inside the conditional if (A[i]<7) we cannot infer anything about the bound on an array access A[j]; moreover, we cannot infer anything about any particular array element. This problem can also prevent us from bounding variables that are assigned values from the array, and from bounding the address width of arrays when they're indexed with valued read from other arrays.

We deal with this problem by doing an additional simple, context-insensitive range analysis as a post-processing step. The data read from the array cannot be wider than the widest data written into the array. We can therefore bound array data width by the largest width of any expression assigned to an element of the array, excluding expressions whose data can be shown by dataflow analysis to come from the array itself.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A computer-implemented method of verifying a software program, said method comprising the computer implemented steps of:

performing a transformation of the software program source code by adding assertions that permit the detection of violations of verification properties;

generating a model which defines a set of executions of the transformed source code;

analyzing the model to verify the software program;

generating error traces when property violations are discovered; and outputting the error traces indicative of the property violations;

THE METHOD CHARCTERIZED IN THAT:

a range analysis is performed thereby generating a bounded range of values for one or more variables in the transformed source code wherein prior to the range analysis the variables may take the full range of integer values;

the generated bounded ranges of values are used by the analyzing step thereby reducing the size of the variables in the model such that the sizes of the reduced variables are still large enough to represent all possible values during execution of the program;

creating three variables v.sub.p, v'.sub.p, v".sub.p with a declaration of int**p, said v.sub.p standing for p, v'.sub.p for *p, and v''.sub.p for **p, and wherein variables representing pointers are desugared into variables of type unsigned int;

performing a first assignment to one of the three variables; and performing a two conditional assignment based on the first assignment and aliasing of the variables.

2. The method of claim 1 CHARACTERIZED IN THAT: the range analysis is limited to a number of steps of the software program execution.

3. The method of claim 1 CHARACTERIZED IN THAT: The range analysis is applied to an array-manipulation occurring within the software program and bounded ranges of values are generated for elements in the array.

4. The method of claim 1 CHARACTERIZED IN THAT: The range analysis is applied to an array-manipulation occurring within the software program and bounded ranges of values are generated for representatives of subsets of elements in the array.

5. The method of claim 2 CHARACTERIZED IN THAT: the range analysis is applied to an array-manipulation occurring within the software program and bounded ranges of values are genrated for elements in the array.

6. The method of claim 2 CHARACTERIZED IN THAT: the range analysis is applied to an array-manipulation occurring within the software program and bounded ranges of values are determined for representatives of subsets of elements in the array.

7. The method of claim 1 CHARACTERIZED IN THAT: the analysis step includes model checking.

8. The method of claim 1 CHARACTERIZED IN THAT: the analyzing step includes model checking.

* * * * *